May 28, 1935. J. YLLA-CONTE 2,003,070
CONSTRUCTION OF LENSES FOR CONCENTRATING THE HEAT OF THE SUN
Filed July 2, 1932
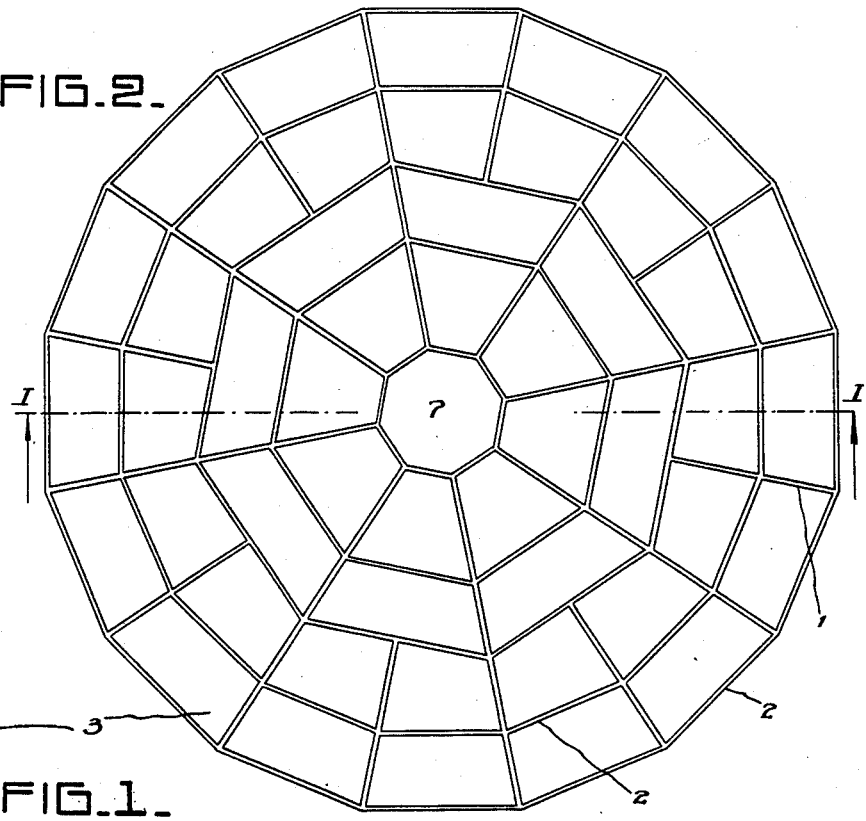
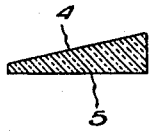 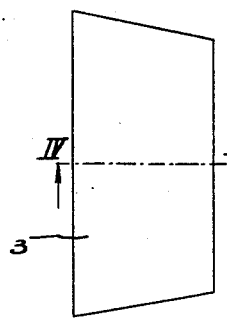
Inventor:-
Jose Ylla-Conte Patented May 28, 1935

2,003,070

UNITED STATES PATENT OFFICE 2,003,070

CONSTRUCTION OF LENSES FOR CONCENTRATING THE HEAT OF THE SUN

José Ylla-Conte, Barcelona, Spain

Application July 2, 1932, Serial No. 620,696
In Spain July 3, 1931

5 Claims. (Cl. 88—57)

Various different arrangements are already known of lenses of relatively large sizes, destined to concentrate the solar heat, either for the object of utilizing this heat concentrated in an oven or crucible for the carrying out chemical or metallurgical operations, or to move hot-air engines or also for other purposes.

The lenses used for these purposes are lenses of large size mounted on a metal framework or structure arranged so as to be able to be aimed at the sun and to follow his apparent motion and in the focus of the lens is placed the crucible, engine or other apparatus which the concentrated solar heat is to utilize. In these applications it is not necessary that the focus of the lens be perfect, but the focus is preferably constituted by a zone of relatively large dimensions corresponding to the surface of the crucible or oven upon which the heat is to be concentrated or to the surface of the part of the engine which is to receive the concentrated heat.

In the co-pending application for patent Serial No. 575,872 of the same inventor, and which has become Patent No. 1,952,237 dated March 27, 1934, is especially described a form of industrial construction of this lens in which the lens is constituted by a series of segments or elementary parts mounted on a metal framework. This construction greatly facilitates the economical obtention of lenses because the elements are all similar for each annular zone and can be manufactured with cast or pressed glass, submitting them afterwards to a simple operation of rectification or polishing. However, the rectification or polishing of the spherical surface of the lens is always a delicate operation which must be made with a certain precision.

The object of this invention is an improvement in which is avoided this necessity of rectifying in a spherical form the surface of the lens and its construction is greatly simplified, consequently reducing the expenses of manufacture.

This improvement consists in constructing the lens likewise formed of a series of segments or elementary parts on a metal frame, but constructing every one of these elementary parts in such a manner that both surfaces or work faces of the lens through which the sun's rays enter and exit be flat, forming between one another a convenient angle. Thus, the surface of the lens is not spherical but is formed of a series of flat faces as in a diamond and each one of the segments or elementary parts of the lens actually acts as a prism which diverts towards the focus a beam of rays practically parallel, and corresponding to the size of the prism or elementary part, the focus being formed by superposition over a common zone of the beams of rays diverted by the different segments or facets.

In consequence of this, the focus of the lens is not perfect but is constituted by a zone whose dimensions correspond approximately to those of the elements or segments which form the lens. However, this is not objectionable, when as in the present case, use is made of large-size lenses.

In the attached drawing there is shown one example of lens construction for concentrating solar heat in accordance with this invention.

Fig. 1 is a cross section of one form of my invention.

Fig. 2 is a plan view of the same.

Figs. 3 and 4 are, respectively, a cross section and a plan view of one of the segments of glass forming the lens.

As is seen in Figs. 1 and 2, the lens is constituted by a flat metallic framework formed by irons or radial elements 1 preferably of T section, and other elements or irons 2 also of T section arranged in circular or polygonal lines. Through the junction of these radial and circular or polygonal irons a light and tough framework results which forms a series of compartments in which can be placed the segments of glass 3 constituting the lens.

In accordance with my invention, these segments of glass 3, as may be seen in the Figs. 1 and 3, have two faces, top face 4 and lower face 5, which are completely flat and form between them in each of the segments, a suitable angle such that each segment 3 acts as a prism which directs towards the focus of the lens a shaft of substantially parallel solar rays.

In order to diminish suitably the amount of glass necessary for the formation of the lens and consequently its weight, and to permit the construction of a lighter framework, it will be seen that in the construction of Fig. 1 the thickness of the segments of glass corresponding to the central zones of the framework such that the lens has a stepped form.

In accordance with my invention each of the segments or elemental pieces forming the lens constitutes a single prism, and its two surfaces, top and bottom, through which the solar rays enter and leave, are completely flat and consequently very easy to produce, and thus they may be polished perfectly at a small cost.

Since each of the elements of the lens acts as a prism which deflects a beam of parallel rays, the center hollow 7 of the framework may be left empty, that is, no glass prisms need be placed therein, because the solar rays passing through this center part do not have to be deflected.

It is clear that this improvement in the manufacture of lenses greatly simplifies their manufacture, especially the operation of rectifying the surfaces of the elements, as in each element have only to be rectified two flat surfaces and it suffices to utilize in the rectification the appropriate mechanical means for these two surfaces to form the necessary angle. For example, there may be utilized a glass polishing machine which does the polishing, always according to the same plane, for example a horizontal plane, and place in the machine the glass segments upon supports appropriate to the proper inclination so that the two flat planes of the surface form the corresponding angle. In this way, in order to form segments with a different inclination its suffices to charge the incline of the support upon which is placed the segment for polishing it.

I claim:—

1. A solar heat concentrating lens, comprising a frame having a flat supporting surface, a plurality of flat-surfaced prismatic glass elemental parts having thick ends all carried by said frame and disposed radially thereabout, one of the large flat sides of each elemental part being disposed in a common plane parallel to the flat supporting surfaces of said frame, the other large flat side of each part being disposed at an angle to the first-mentioned side, the thick ends of the elemental parts being directed towards the center of the lens, whereby the parts direct beams of parallel rays toward the focus of the lens.

2. An optical device, including means for transmitting without material loss and concentrating light beams, the said means comprising a substantially circular, grid-like frame having a flat supporting surface, a plurality of flat-surfaced prismatic glass elements having thick ends carried by said frame, and disposed in the interstices of the frame, in approximately the manner of segments of a circle, the said glass elements transmitting light beams and having their large flat surfaces acting as refracting surfaces for directing the beams towards the center axis of the frame, and disposed at an angle to each other, the thick ends of the elements being directed towards the center of the lens.

3. An optical device, including means for transmitting without material loss and concentrating light beams, the said means comprising a substantially circular, grid-like frame having a flat supporting surface, a plurality of flat-surfaced prismatic glass elements having thick ends carried by said frame, and loosely disposed in the interstices of the frame, in approximately the manner of segments of a circle, the said glass elements transmitting light beams and having their large flat surfaces acting as refracting surfaces for directing the beams towards the center axis of the frame, and disposed at an angle to each other, the thick ends of the elements being directed towards the center of the lens.

4. An optical device, including means for transmitting without material loss and concentrating light beams, the said means comprising a substantially circular, grid-like frame having a flat supporting surface, a plurality of flat-surfaced prismatic glass elements having thick ends carried by said frame, and disposed in the interstices of the frame, in approximately the manner of segments of a circle, the said glass elements transmitting light beams and having their large flat surfaces acting as refracting surfaces for directing the beams towards the center axis of the frame, and disposed at an angle to each other, the thick ends of the elements being directed towards the center of the lens, one of the large flat surfaces of each element being disposed in a common plane.

5. An optical device, including means for transmitting without material loss and concentrating light beams, the said means comprising a substantially circular, grid-like frame having a flat supporting surface, a plurality of flat-surfaced prismatic glass elements having thick ends carried by said frame, and disposed in the interstices of the frame, in approximately the manner of segments of a circle, the said glass elements transmitting light beams and having their large flat surfaces acting as refracting surfaces for directing the beams towards the center axis of the frame, and disposed at an angle to each other, the thick ends of the elements being directed towards the center of the lens, parallel to the plane of the frame.

JOSÉ YLLA-CONTE.